(12) United States Patent
Rehman

(10) Patent No.: US 9,536,215 B2
(45) Date of Patent: Jan. 3, 2017

(54) REAL-TIME AND OFFLINE LOCATION TRACKING USING PASSIVE RFID TECHNOLOGIES

(75) Inventor: Samuelson Rehman, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 721 days.

(21) Appl. No.: 11/685,673

(22) Filed: Mar. 13, 2007

(65) Prior Publication Data
US 2008/0224867 A1    Sep. 18, 2008

(51) Int. Cl.
*H04Q 5/22*       (2006.01)
*G06Q 10/08*      (2012.01)
*G06K 17/00*      (2006.01)

(52) U.S. Cl.
CPC ..................................... *G06Q 10/08* (2013.01)

(58) Field of Classification Search
CPC ........ G01S 5/0252; G01S 13/765; G01S 1/68; G01S 5/0289; G01S 5/06; G01S 5/14; G01S 19/09; G01S 19/14; G06K 2017/0045; G06K 17/00; G06K 17/0029; G06K 7/0008; G06K 7/10336; G06K 7/10356; G06K 2017/0048; G06K 19/0723; G06K 19/07796; G06K 7/10178; G07C 9/00111; H04W 64/00; G06Q 20/203; Y02B 60/50; B65D 2203/10
See application file for complete search history.

(56) References Cited

U.S. PATENT DOCUMENTS

| | | | | |
|---|---|---|---|---|
| 5,365,516 A | * | 11/1994 | Jandrell | ........................ 370/335 |
| 5,565,858 A | * | 10/1996 | Guthrie | .................. G01S 19/09 |
| | | | | 235/385 |
| 6,600,418 B2 | * | 7/2003 | Francis et al. | ............. 340/572.1 |
| 6,724,308 B2 | * | 4/2004 | Nicholson | ............ B65D 5/4233 |
| | | | | 340/10.1 |
| 6,812,824 B1 | * | 11/2004 | Goldinger | .............. G06K 17/00 |
| | | | | 340/10.1 |
| 6,832,251 B1 | | 12/2004 | Gelvin et al. | |
| 6,843,415 B2 | | 1/2005 | Vogler | |
| 7,000,834 B2 | | 2/2006 | Hind et al. | |

(Continued)

OTHER PUBLICATIONS

U.S. Appl. No. 11/685,655, Final Office Action mailed on Dec. 22, 2010, 10 pages.

(Continued)

*Primary Examiner* — Ryan Zeender
*Assistant Examiner* — Dana Amsdell
(74) *Attorney, Agent, or Firm* — Precision IP

(57) ABSTRACT

A system for location tracking using passive tags includes a reader and a location tracker. The reader receives an identifier associated with a first passive tag. The location tracker receives the location of the passive tag, and maps the location of the first passive tag to the identifier associated with the first passive tag. The location tracker determines the location of an object based on the location of the first passive tag. The location tracker may receive the location of a second passive tag, and map the location of the second passive tag to an identifier associated with the second passive tag. The location tracker may update the location of the object using the location of the second passive tag in response to the reader receiving the identifier associated with the second passive tag.

20 Claims, 9 Drawing Sheets

(56) References Cited

U.S. PATENT DOCUMENTS

| | | | |
|---|---|---|---|
| 7,295,132 B2* | 11/2007 | Steiner | 340/825.49 |
| 7,403,120 B2* | 7/2008 | Duron | G01S 13/75 |
| | | | 235/385 |
| 7,633,387 B2* | 12/2009 | Carmichael et al. | 340/539.13 |
| 7,800,499 B2 | 9/2010 | Rehman | |
| 8,042,737 B2 | 10/2011 | Rehman | |
| 8,099,737 B2 | 1/2012 | Rehman | |
| 2002/0111819 A1 | 8/2002 | Li et al. | |
| 2002/0130778 A1* | 9/2002 | Nicholson | B65D 5/4233 |
| | | | 340/572.1 |
| 2003/0001775 A1* | 1/2003 | Turner | G01S 5/0027 |
| | | | 342/357.48 |
| 2003/0009398 A1 | 1/2003 | Lin et al. | |
| 2003/0115072 A1 | 6/2003 | Manucha et al. | |
| 2003/0144985 A1 | 7/2003 | Ebert | |
| 2003/0227392 A1* | 12/2003 | Ebert | G06K 17/00 |
| | | | 340/8.1 |
| 2004/0090472 A1 | 5/2004 | Risch et al. | |
| 2004/0093479 A1 | 5/2004 | Ramchandran | |
| 2004/0243636 A1 | 12/2004 | Hasiewicz et al. | |
| 2004/0249590 A1 | 12/2004 | Ota et al. | |
| 2005/0110641 A1* | 5/2005 | Mendolia | G01S 5/04 |
| | | | 340/572.7 |
| 2005/0110674 A1* | 5/2005 | Mendolia | G01S 5/04 |
| | | | 342/81 |
| 2005/0159187 A1* | 7/2005 | Mendolia | G01S 5/04 |
| | | | 455/562.1 |
| 2005/0177466 A1 | 8/2005 | Willins | |
| 2005/0204014 A1 | 9/2005 | Yao et al. | |
| 2006/0022800 A1* | 2/2006 | Krishna | G06K 7/0008 |
| | | | 340/10.2 |
| 2006/0022801 A1* | 2/2006 | Husak | G06K 7/0008 |
| | | | 340/10.5 |
| 2006/0023679 A1* | 2/2006 | Twitchell, Jr. | H04Q 9/00 |
| | | | 370/338 |
| 2006/0033608 A1 | 2/2006 | Juels et al. | |
| 2006/0080732 A1 | 4/2006 | Ohkubo et al. | |
| 2006/0092072 A1* | 5/2006 | Steiner | G01C 3/26 |
| | | | 342/46 |
| 2006/0144940 A1 | 7/2006 | Shannon et al. | |
| 2006/0170565 A1* | 8/2006 | Husak et al. | 340/825.49 |
| 2006/0181397 A1 | 8/2006 | Limbachiya | |
| 2006/0184980 A1 | 8/2006 | Cole | |
| 2006/0187031 A1* | 8/2006 | Moretti et al. | 340/539.22 |
| 2006/0230276 A1 | 10/2006 | Nochta | |
| 2007/0008129 A1* | 1/2007 | Soliman | 340/572.1 |
| 2007/0093991 A1 | 4/2007 | Hoogenboom | |
| 2007/0120670 A1* | 5/2007 | Torchalski | G06K 17/00 |
| | | | 340/572.1 |
| 2007/0174146 A1 | 7/2007 | Tamarkin et al. | |
| 2007/0205896 A1* | 9/2007 | Beber | G06K 7/0008 |
| | | | 340/572.1 |
| 2007/0208445 A1 | 9/2007 | Gibson et al. | |
| 2007/0210916 A1 | 9/2007 | Ogushi et al. | |
| 2007/0219916 A1 | 9/2007 | Lucas | |
| 2007/0229229 A1 | 10/2007 | Nelson et al. | |
| 2007/0257857 A1* | 11/2007 | Marino et al. | 343/867 |
| 2007/0260428 A1 | 11/2007 | Anderson et al. | |
| 2007/0282482 A1* | 12/2007 | Beucher | G06Q 10/08 |
| | | | 700/225 |
| 2007/0283005 A1 | 12/2007 | Beliles et al. | |
| 2008/0005287 A1 | 1/2008 | Harvey | |
| 2008/0024268 A1 | 1/2008 | Wong | |
| 2008/0030335 A1* | 2/2008 | Nishida et al. | 340/572.1 |
| 2008/0052201 A1 | 2/2008 | Bodin et al. | |
| 2008/0099557 A1 | 5/2008 | James | |
| 2008/0224866 A1 | 9/2008 | Rehman | |
| 2008/0302871 A1 | 12/2008 | Rehman | |
| 2008/0303667 A1 | 12/2008 | Rehman | |
| 2008/0307435 A1 | 12/2008 | Rehman | |
| 2009/0005916 A1 | 1/2009 | Wainwright et al. | |
| 2009/0065579 A1 | 3/2009 | Grant et al. | |
| 2009/0096608 A1 | 4/2009 | Rehman | |
| 2010/0029299 A1 | 2/2010 | Riise et al. | |
| 2010/0039230 A1* | 2/2010 | Voutilainen | G01R 31/2822 |
| | | | 340/10.1 |
| 2011/0315765 A1* | 12/2011 | Schantz | G01S 13/751 |
| | | | 235/385 |

OTHER PUBLICATIONS

U.S. Appl. No. 11/685,655, Final Office Action mailed on Mar. 15, 2012, 11 pages.

U.S. Appl. No. 11/685,655, Final Office Action mailed on Mar. 7, 2013, 12 pages.

U.S. Appl. No. 11/685,655, Final Office Action mailed on Dec. 9, 2013, 14 pages.

U.S. Appl. No. 11/685,655, Non-Final Office Action mailed on Sep. 30, 2011, 10 pages.

U.S. Appl. No. 11/685,655, Non-Final Office Action mailed on Sep. 14, 2012, 13 pages.

U.S. Appl. No. 11/685,655, Non-Final Office Action mailed on Jul. 18, 2013, 13 pages.

U.S. Appl. No. 11/685,655, Non-Final Office Action mailed on Jul. 8, 2010, 8 pages.

U.S. Appl. No. 11/758,527, Final Office Action mailed on Mar. 7, 2011, 17 pages.

U.S. Appl. No. 11/758,527, Non-Final Office Action mailed on Sep. 30, 2010, 13 pages.

U.S. Appl. No. 11/758,527, Notice of Allowance mailed on Sep. 16, 2011, 16 pages.

U.S. Appl. No. 11/758,532, Final Office Action mailed on Dec. 16, 2009, 17 pages.

U.S. Appl. No. 11/758,532, Non-Final Office Action mailed on Jun. 23, 2009, 13 pages.

U.S. Appl. No. 11/758,532, Notice of Allowance mailed on Jun. 11, 2010, 20 pages.

U.S. Appl. No. 11/758,538, Final Office Action mailed on Jul. 24, 2009, 11 pages.

U.S. Appl. No. 11/758,538, Final Office Action mailed on Aug. 4, 2010, 20 pages.

U.S. Appl. No. 11/758,538, Non-Final Office Action mailed on Feb. 19, 2010, 15 pages.

U.S. Appl. No. 11/758,538, Non-Final Office Action mailed on Mar. 18, 2011, 5 pages.

U.S. Appl. No. 11/758,538, Non-Final Office Action mailed on Mar. 31, 2009, 7 pages.

U.S. Appl. No. 11/758,538, Notice of Allowance mailed on Jul. 22, 2011, 7 pages.

U.S. Appl. No. 11/871,829, Final Office Action mailed on Dec. 23, 2011, 16 pages.

U.S. Appl. No. 11/871,829, Final Office Action mailed on Sep. 13, 2013, 19 pages.

U.S. Appl. No. 11/871,829, Non-Final Office Action mailed on Jun. 8, 2011, 11 pages.

U.S. Appl. No. 11/871,829, Non-Final Office Action mailed on Mar. 27, 2013, 18 pages.

U.S. Appl. No. 11/871,829, Non-Final Office Action mailed on Jan. 31, 2014, 19 pages.

U.S. Appl. No. 11/685,655, Restriction Requirement mailed on Mar. 26, 2010, 6 pages.

U.S. Appl. No. 11/685,655, Non-Final Office Action mailed on Aug. 28, 2014, 6 pages.

U.S. Appl. No. 11/685,655, Notice of Allowance mailed on May 12, 2014, 11 pages.

U.S. Appl. No. 11/685,655, Notice of Allowance mailed on Mar. 6, 2015, 9 pages.

U.S. Appl. No. 11/758,532, Advisory Action mailed on Feb. 26, 2010, 3 pages.

U.S. Appl. No. 11/758,538, Advisory Action mailed on Oct. 13, 2009, 3 pages.

U.S. Appl. No. 11/871,829, Final Office Action mailed on Jul. 25, 2014, 18 pages.

U.S. Appl. No. 11/871,829, Non-Final Office Action mailed on Feb. 24, 2015, 17 pages.

(56) References Cited

OTHER PUBLICATIONS

Final office action mailed on Sep. 25, 2015 for U.S. Appl. No. 11/871,829, all pages.

* cited by examiner

REAL-TIME AND OFFLINE LOCATION TRACKING USING PASSIVE RFID TECHNOLOGIES

CROSS-REFERENCES TO RELATED APPLICATIONS

This application is related to U.S. patent application Ser. No. 11/685,655 filed Mar. 13, 2007 and entitled "Virtualization and Quality of Sensor Data," the entire disclosure of which is incorporated by reference herein for all purposes.

BACKGROUND OF THE INVENTION

Embodiments of the present invention generally relate to Radio Frequency Identification (RFID) applications. More specifically, embodiments of the present invention relate to techniques for real-time and offline location tracking using passive RFID technologies.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that the computer applications are limited to using only the data retrieved from the specific RFID readers.

In order to provide automated shipping and receiving, real-time inventory, automated shipping and received, and real-time security, other types of RFID sensor devices, such as environment sensors (e.g., temperature and humidity sensors), location sensors (e.g., Global Positioning System or GPS devices), and notification devices, may be required. For example, one cold chain solution provides an RFID tag embedded with a temperature sensor. Cold chain refers to a temperature-controlled supply chain. An unbroken cold chain is an uninterrupted series of storage and distribution activities which maintain a given temperature range.

However, one problem with embedding sensors with RFID tags is that the increase in cost and complexity associated with each RFID tag. Furthermore, if computer applications are tied directly to specific RFID readers, the only items for which sensor data can be used from those applications are those that can be tagged and directly sensed using the specific RFID readers.

Accordingly, what is desired are improved methods and apparatus for solving the problems discussed above, while reducing the drawbacks discussed above.

BRIEF SUMMARY OF THE INVENTION

Embodiments of the present invention generally relate to Radio Frequency Identification (RFID) applications. More specifically, embodiments of the present invention relate to techniques for real-time and offline location tracking using passive RFID technologies.

In various embodiments, a method for location tracking using passive tags includes receiving information specifying location of a first passive tag. The location of the first passive tag is mapped to an identifier associated with the first passive tag. The identifier associated with the first passive tag is then received using a first antenna field of a reader. The location of an object is determined based on the location of the first passive tag.

According to one embodiment, the object is the reader used to receive the identifier associated with the first passive tag. In some embodiments, an identifier associated with a second passive tag is received using the first antenna field of the reader. Information specifying the location of the second passive tag is generated based on the location of the first passive tag. The location of the second passive tag is may be mapped to the identifier associated with the second passive tag to determine the location of the second passive tag.

In various embodiments, information specifying location of a second passive tag is received. The location of the second passive tag is mapped to an identifier associated with the second passive tag. The identifier associated with the second passive tag is received using a second antenna field of the reader. The location of the object is then updated based on the location of the second passive tag.

According to one embodiment, the identifier associated with the second passive tag may be at a different time from when the identifier associated with the first passive tag was received. The location of the object may be tracked based on the location of the first passive tag and the location of the second passive tag. The location of the object may further be determined in real-time based on receiving the identifier associated with the first passive tag.

In some embodiments, the information specifying the location of the first passive tag may be received from the first passive tag. In various embodiments, a discrepancy and/or conflict in the location of the object may be determined.

In some embodiments, a system for location tracking using passive tags includes a reader and a location tracker. The reader receives an identifier associated with a first passive tag using a first antenna field of the reader. The location tracker receives information specifying location of the first passive tag, and maps the location of the first passive tag to the identifier associated with the first passive tag. The location tracker determines location of an object based on the location of the first passive tag.

In some embodiments, a computer program product stored on a computer readable medium configured to store instructions operational when executed by a processor of a computer system for location tracking using passive tags is provided. The computer program product includes code for receiving information specifying location of a first passive tag, code for mapping the location of the passive tag to an identifier associated with the first passive tag, code for receiving the identifier associated with the first passive tag using a first antenna field of a reader, and code for determining location of an object based on the location of the first passive tag.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.

Collection of Sensor Data

In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
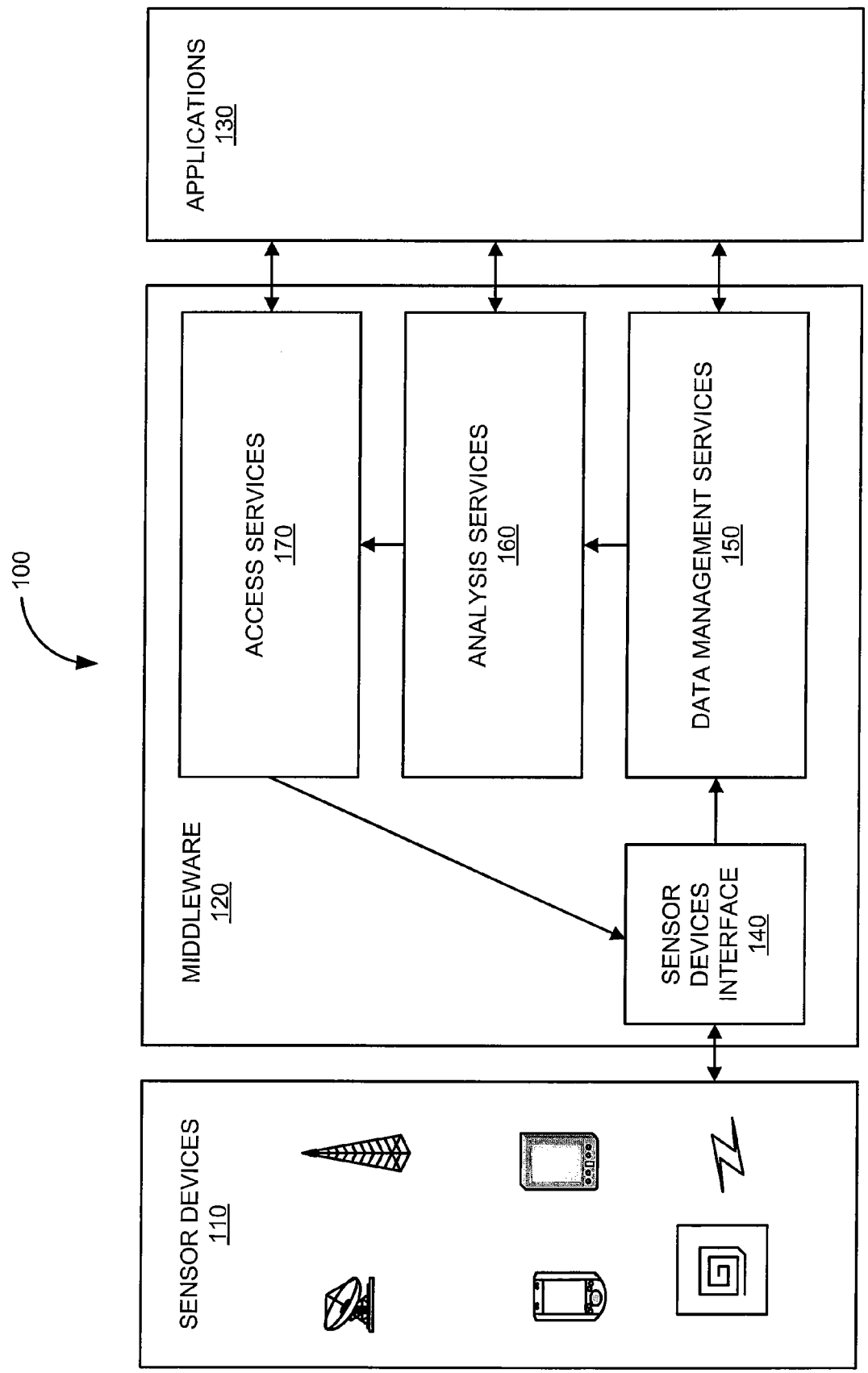
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110. Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and JD Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Figure 2:
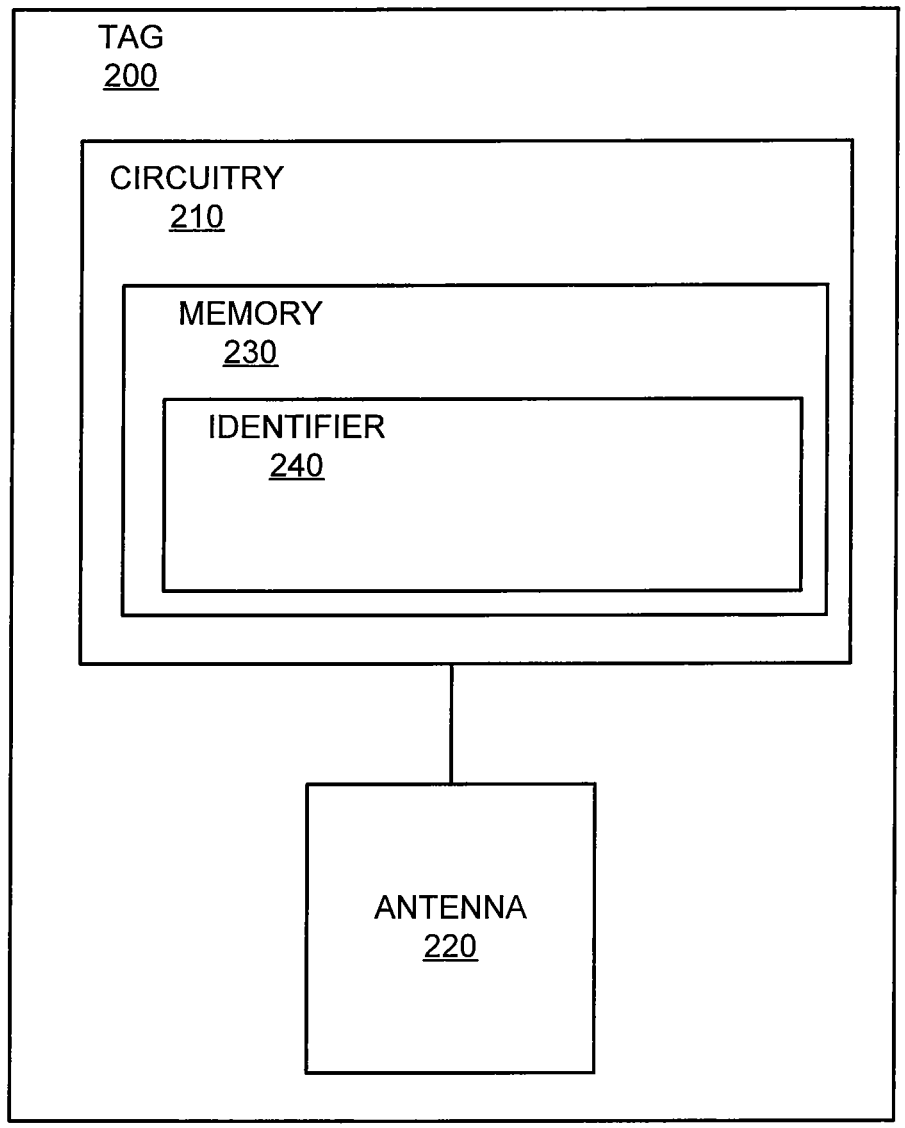
FIG. 2 is a block diagram of a tag in one embodiment according to the present invention.

FIG. 2 is a block diagram of a tag 200 in one embodiment according to the present invention. In this example, tag 200 includes circuitry 210 coupled to an antenna 220. Circuitry 210 includes a memory 230. Memory 230 includes an identifier 240.

In operation, tag 200 typically obtains power to operate circuitry 210 from an inductive coupling of tag 200 to energy circulating around a reader coil (e.g., low frequency, high frequency, very high frequency, and ultra high frequency radio waves). In some embodiments, tag 200 operates in a low frequency (LF) band (e.g., 13.56 MHz). Alternatively, tag 200 may use radiative coupling, such as in ultra-high frequency (UHF) and microwave RFID systems to energize circuitry 210 which in turn communicates data (e.g., identifier 240) stored in memory 230 via antenna 220. Antenna 220 typically is a conductive element that enables circuitry 210 to communicate data.

In general, tag 200 and other contactless cards, smart labels, transponders, and the like, typically use three basic technologies: active, passive, and semi-passive. Active tags typically use a battery to power microchip circuitry and transmit signals to readers. Active tags can generally be read from distances of 100 ft. or more. Passive tags do not include a battery. Instead, passive tags draw power from a magnetic field that is formed by the coupling of an antenna element in the tags with the coiled antenna from a reader. Semi-passive tags are similar to active tags in that they use a battery to run microchip circuitry. However, in semi-passive tags, the battery generally is not used to broadcast a signal to the reader.

In various embodiments, circuitry 210 may include an RF interface and control logic, in addition to memory 230, combined in a single integrated circuit (IC), such as a low-power complementary metal oxide semiconductor (CMOS) IC. For example, the RF interface can be an analog portion of the IC, and the control logic and memory 230 can be a digital portion of the IC. Memory 230 may be a non-volatile read-write memory, such as an electrically erasable programmable read only memory (EEPROM).

In some embodiments, circuitry 210 includes an antenna tuning capacitor and an RF-to-DC rectifier system designed for Antenna 220, which is the coupling element for tag 200. Antenna 210 can enable tag 200 using passive RFID to obtain power to energize and active circuitry 210. Antenna 220 can have many different shapes and sizes, depending on the type of coupling system (e.g., RFID) being employed.

Some examples of tag 200 are ISO 11784 & 11785 tags, ISO 14223/1 tags, ISO 10536 tags, ISO 14443 tags, ISO 15693 tags, ISO 18000 tags, EPC global, ANSI 371.1, 2 and 3, AAR S918, and the like.

In some embodiments, circuitry 210 of tag 200 is configured to read from and write to memory 230. Identifier 240 is generally a unique serial number. Identifier 240 may also be hard coded into circuitry 210. In some embodiments, information such as a product information and location may be encoded in memory 230 of circuitry 210.

Figure 3:
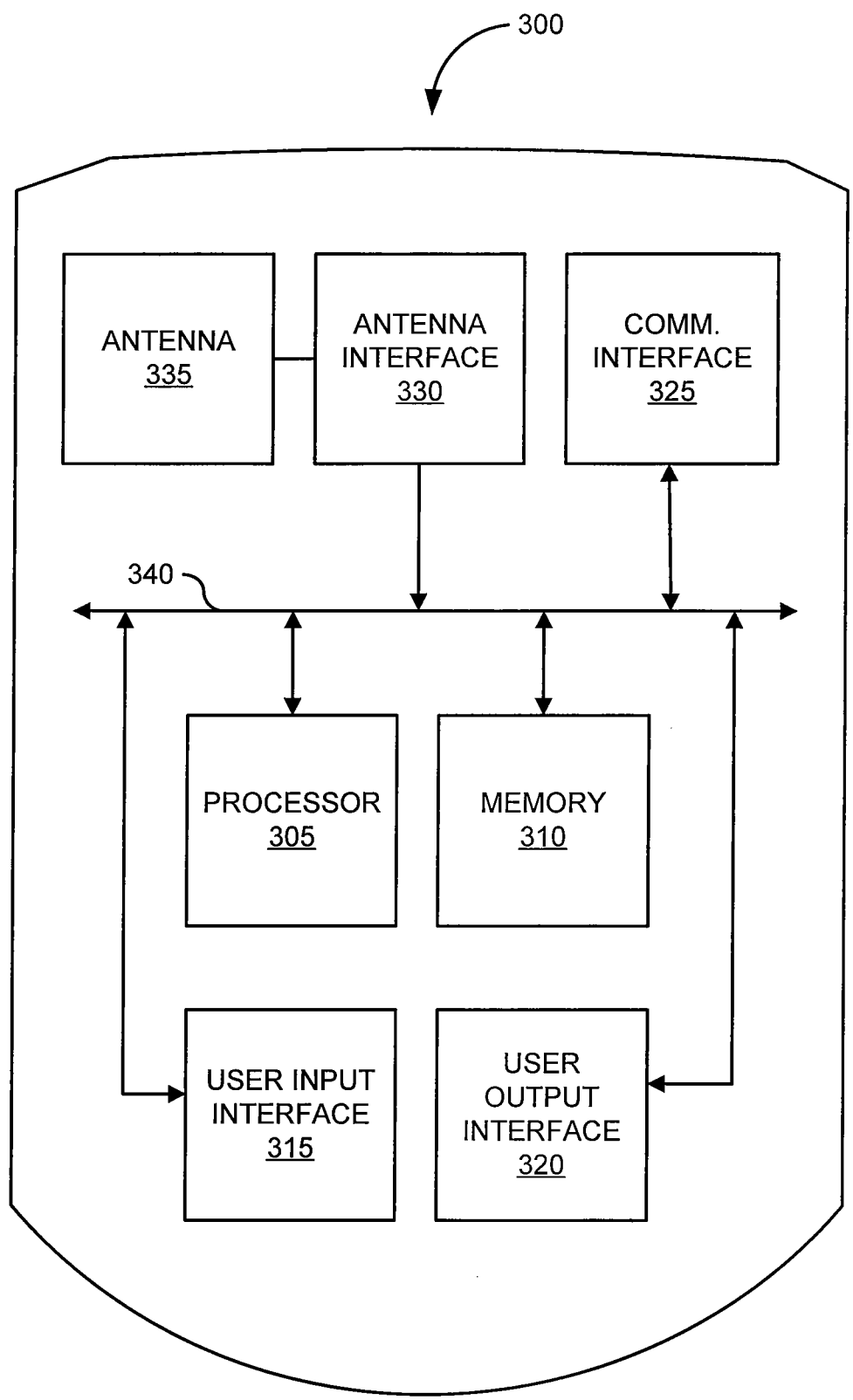
FIG. 3 is a block diagram of an interrogator/reader in one embodiment according to the present invention.

FIG. 3 is a block diagram of an interrogator/reader 300 in one embodiment according to the present invention. In this example, reader 300 includes a processor 305, a memory 310, a user input interface 315, a user output interface 320, a communications interface 325, an antenna interface 330, an antenna 335, and a system bus 340. Processor 305, memory 310, user input interface 315, user output interface 320, communications interface 325, and antenna interface 330 are coupled via system bus 340. Antenna interface 320 is linked to antenna 325.

In this example, reader 300 uses radio frequencies to communicate with tag 200 using antenna 335. For example, when tag 200 is within proximity of reader 300, tag 200 draws power from a magnetic field that is formed by the coupling of antenna 220 from tag 200 with antenna 335 from reader 300. Circuitry 210 from tag 200 then transmits identifier 240 via antenna 220. Reader 300 detects the transmission using antenna 335 and receives identifier 240 through antenna interface 330. In some embodiments, reader 300 stores the identifier 240 in memory 310. Reader 300 may transmit data, including identifier 240, in digital or analog form to sensor devices interface 140 using communications interface 325.

In various embodiments, reader 300 uses low, high, ultra-high, and microwave frequencies to store and retrieve data from products or devices using RFID tags.

Figure 4:
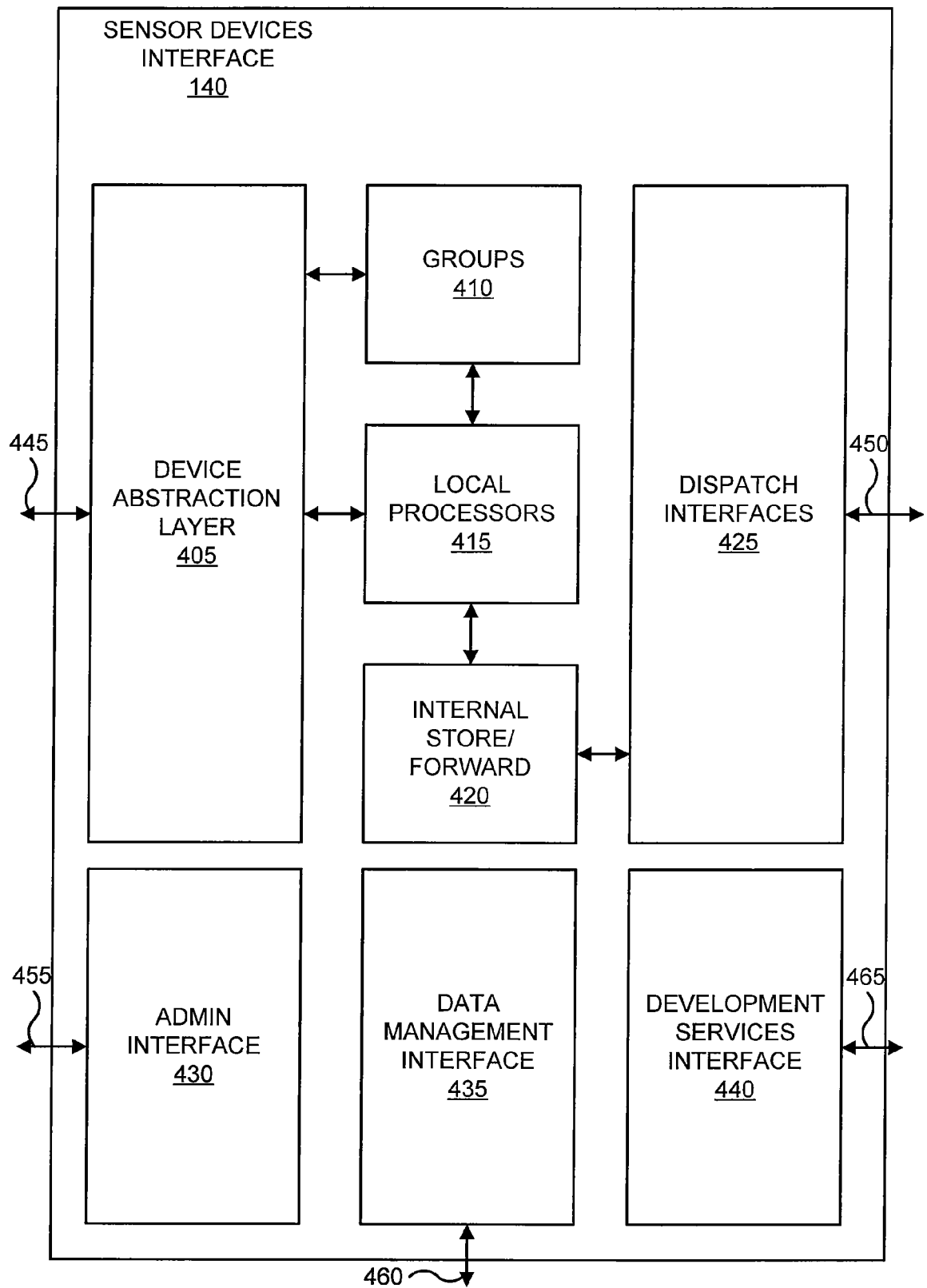
FIG. 4 is a block diagram of a system for interfacing with sensor devices to provide real-time and offline location tracking using passive RFID technologies in one embodiment according to the present invention.

FIG. 4 is a block diagram of sensor devices interface 140 for interfacing with sensor devices 110 to provide virtualization and quality of data in one embodiment according to the present invention.

In this example, sensor devices interface 140 includes device abstraction layer 405, groups module 410, local processors 415, internal store/forward module 420, dispatch interfaces 425, administration interfaces 430, data management interface 435, and development services interface 440. Device abstraction layer 405 is linked to groups module 410 and local processors 415. Local processors 415 are linked to groups module 410 and to internal store/forward module 420. Internal store/forward module 420 is link to dispatch interface 425.

Device abstraction layer 405 communicates via line 445 with sensor devices 110 to received collected sensor data and drive operations of one or more of sensor devices 110. Dispatch interface 425 communicates collected sensor data via line 450 with one or more applications, such as analysis services 160 and applications 130. Administration interface 430 is link via line 455 to one or more computers systems that administer the operations of sensor devices interface 140. Data management interface 435 communicates collected sensor data via line 460 with data repositories, such as a database provided by data management services 150. Development services interface 440 communicates via line 465 with applications to provide an Application Program Interface (API) to collected sensor data and operations of one or more of sensor devices 110.

Device abstraction layer 405 includes hardware and/or software elements that received collected sensor data and drive the operations of one or more of sensor devices 110. In one embodiment, device abstraction layer 405 provides a plug-and-play architecture and extendable driver framework that allows applications (e.g., Applications 130) to be device agnostic and utilize various sensors, readers, printers, and notification devices. In some embodiments, device abstraction layer 405 may include out-of-the-box drivers for readers, printers, and display/notification devices from various vendors, such as Alien of Morgan Hill, Calif. and Intermec of Everett, Wash.

Groups module 410 and local processors 415 include hardware and/or software elements that provide a framework for simple, aggregate, and programmable filtering of sensor data received from device abstraction layer 405. For example, using groups module 410, filters executed by local processors 415 are applied to a single device or to logical groups of devices to collect sensor data that satisfies predefined criteria. Local processors 415 include hardware and/or software elements for creating filters and rules using sensor data. Some examples of filters may include Pass Filter, Movement Filter, Shelf Filter, Cross Reader Filter, Check Tag Filter, Pallet Shelf Filter, Pallet Pass Filter, and Debug Filter. In some embodiments, filters and rules may be created using the JavaScript programming language and through the use of regular expressions.

Internal store/forward module 420 includes hardware and/or software elements that provide an interface between local processors 415 and dispatch interfaces 425. In one example, internal store/forward module 420 includes a buffer used for communication between local processors 415 and dispatch interfaces 424. Dispatch interfaces 425 include hardware and/or software elements that disseminate sensor data to applications (e.g., applications 130). In some embodiments, dispatch interfaces 425 include a web services component, an HTTP-dispatcher component, a stream dispatcher component, and an interface supporting subscription or query based notification services.

Administration interface 430 includes hardware and/or software elements that managing operations of sensor devices interface 140. In one example, administration interface 430 provides a task oriented user interface for adding, configuring, and removing devices, creating and enabling filters and rules, and creating and enabling dispatchers that disseminate sensor data.

Data management services 435 include hardware and/or software elements that provide reporting, associations, and archiving of sensor data. Development services interface 440 includes hardware and/or software elements that provide an Application Program Interface (API) to collected sensor data and operations of one or more of sensor devices 110. Some examples of API services provided by development services interface 440 include web services, IS services, device management, monitoring interfaces, EPC management, and raw sensor data interfaces.

In one example of operation, sensor devices interface 140 collects sensor data from sensor devices 110 (e.g., RFID readers, RFID tags or labels, temperature sensors, laser diodes, etc.) using device abstraction layer 405. Groups module 410 and local processors 415 filter, clean, and normalize the collected sensor data and forward "relevant" events, such as those that meet predefined criteria or are obtained from a selected device, to internal store/forward interface 420.

The filtered sensor data is then distributed by internal store/forward interface 420 to various distribution systems through dispatch interfaces 425. The unfiltered and/or filters sensor data may further be archived and storage using data management interface 435.

In various embodiments, sensor devices interface 140 provides a system for collection, filtering, and access to sensor data. Sensor devices interface 140 can provide management and monitoring of sensor devices 110 by printing labels, operating sensors, light stacks, message boards, carousels, and the like. In some embodiments, sensor devices interface 140 provides scalability that allows access to sensor data without being tied to one specific vendor application.

Location Tracking

In various embodiments, system 100 provides location tracking of products, devices, persons, and the like, using passive RFID technologies. In one embodiment, a system for location tracking using passive RFID tags includes a reader (e.g., reader 300 of FIG. 3) and a location tracker (e.g., middleware 120 of FIG. 1). In general, the reader receives an identifier associated with a passive tag (e.g., tag 200 of FIG. 2). The location tracker receives information specifying the location of the passive tag, and maps the location of the passive tag to the identifier associated with the passive tag. The location tracker then determines the location of an object based on the location of the passive tag.

In various embodiments, system 100 determines the location of reader 300 using the location of passive RFID tags, as reader 300 receives identifiers associated with each of the passive RFID tags. In some embodiments, system 100 determines the location of an object, such a product or container, using the known location of various passive RFID tags.

Figure 5:
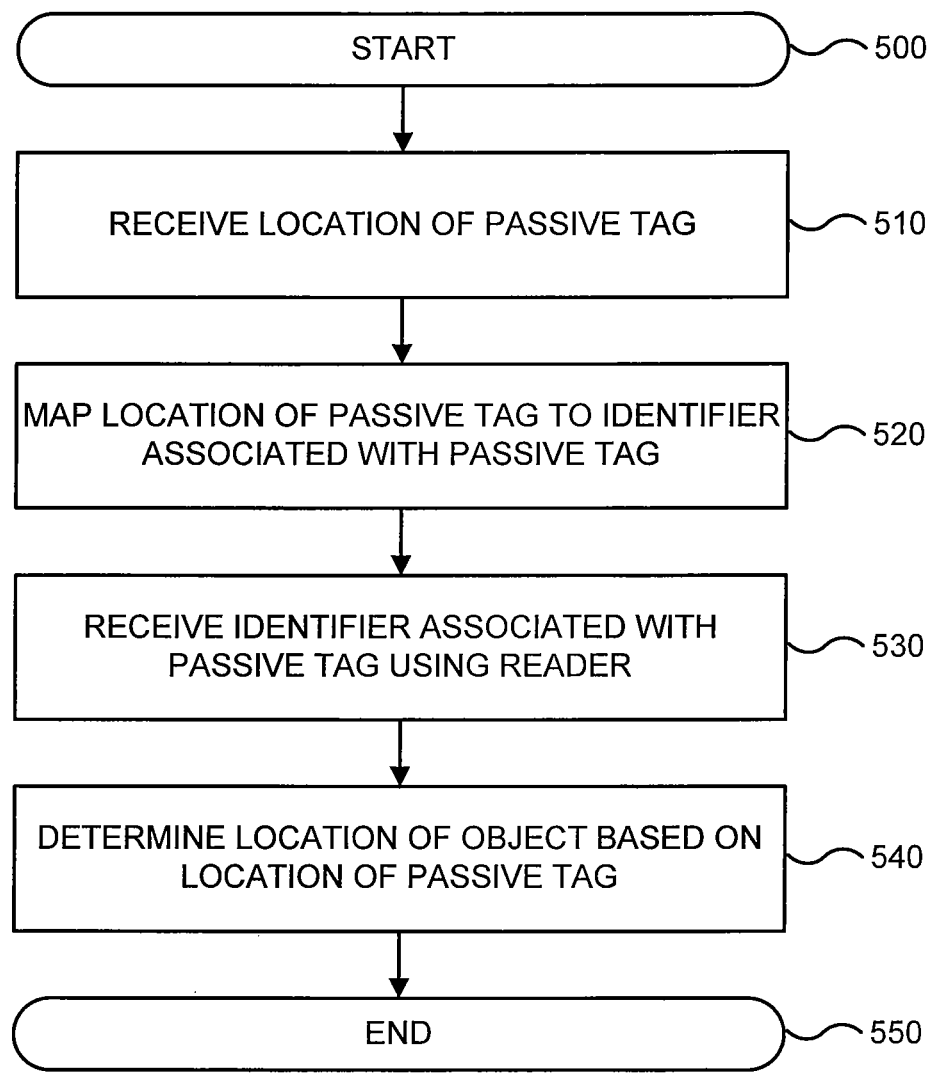
FIG. 5 is a simplified flowchart for location tracking using passive RFID tags in one embodiment according to the present invention.

FIG. 5 is a simplified flowchart for location tracking using passive RFID tags in one embodiment according to the present invention. The processing depicted in FIG. 5 may be performed by software modules (e.g., instructions or code) executed by a processor of a computer system, by hardware modules of the computer system, or combinations thereof. FIG. 5 begins in step 500.

In step 510, system 100 receives information specifying the location of a passive tag (e.g., tag 200 of FIG. 2). Some examples of location information include latitude, longitude, altitude, physical location, logical location, distance, height, proximity, relative location to another object, and the like.

In step 520, system 100 maps the location of the passive tag to an identifier associated with the passive tag. In one example, system 100 constructs a look-up table having the location of the passive tag and the identifier associated with the passive tag. In another embodiment, system 100 stores the location of the passive tag in a database (e.g., using data management services 150) with the identifier as a key or index for each row in the database.

In step 530, system 100 receives the identifier associated with the passive tag using a reader. In step 540, system 100 determines location of an object based on the location of the passive tag. FIG. 5 ends in step 550.

In one example, reader 300 (FIG. 3) receives identifier 240 of tag 200 and an identifier associated with a box. System 100 may determine the location of the box using the location of tag 200.

In another example, reader 300 (FIG. 3) receives only identifier 240 of tag 200. System 100 may determine that reader 300, as embodied in a mobile or handheld RFID device, is positioned at or near the location associated with tag 200. The system 100 may approximate the location of reader 300 based on the size, strength, pattern, etc. of an antenna field associated with reader 300. For example, if an antenna field associated with reader 300 has a range of 10 meters, and identifier 240 is received within that 10 meter antenna field, system 100 approximates the location of reader 300 to +/−10 meters. If two or more identifiers of passive RFID tags whose location is known are received, system 100 may triangulate the location of reader 300 with reasonable accuracy.

Figure 6:
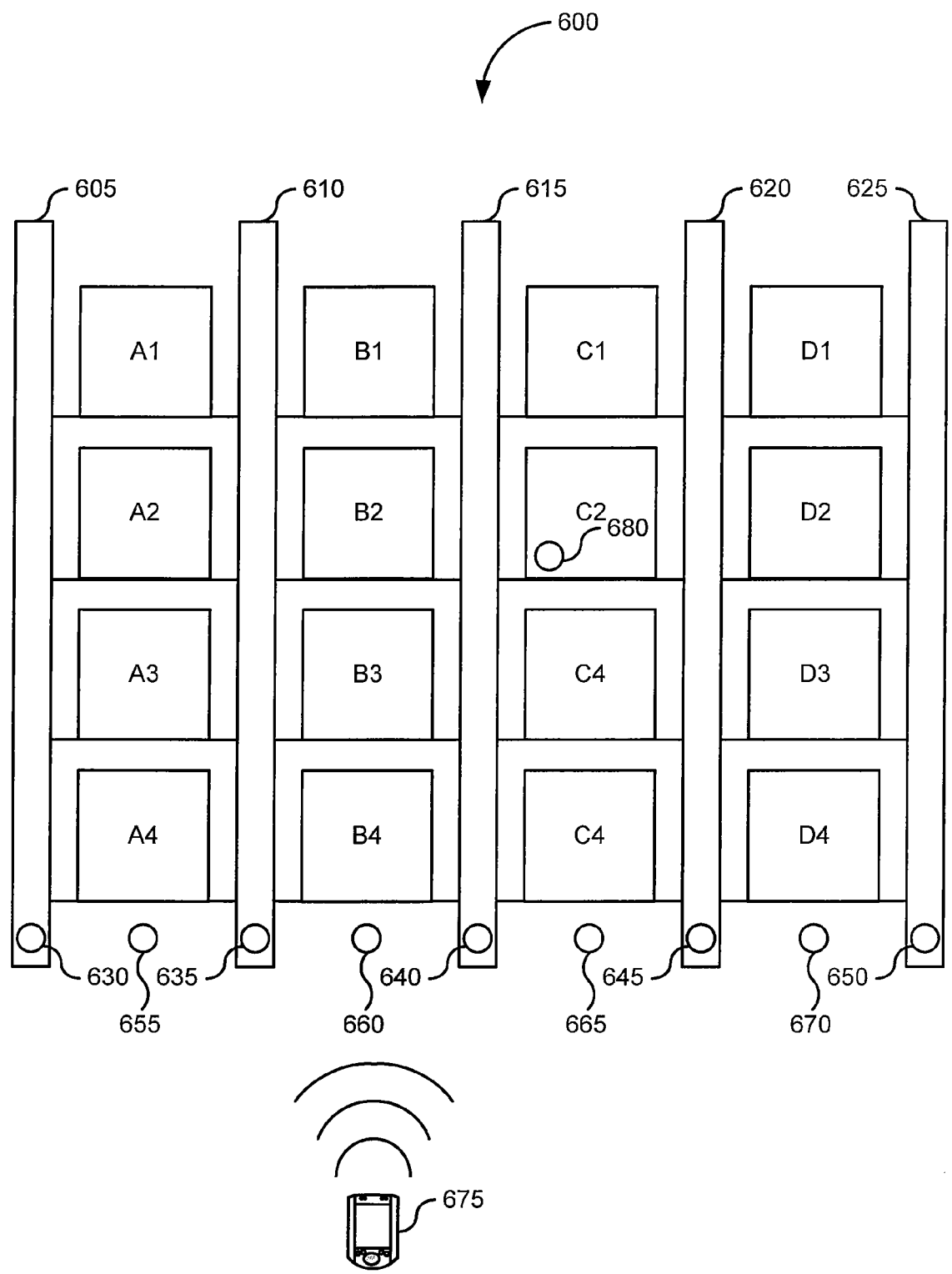
FIG. 6 depicts location tracking using an interrogator/reader and passive RFID tags in one embodiment according to the present invention.

FIG. 6 depicts location tracking using an interrogator/reader 675 and various passive RFID tags in one embodiment according to the present invention. In this example, a warehouse shelf 600 includes support posts 605, 610, 615, 620, and 625. As shown in FIG. 6, between each pair of support post of warehouse shelf 600 is located a plurality of holding bins or shelves (e.g., bins A1-A4, bins B1-B4, bins C1-C4, and bins D1-D4).

Holding bins A1-A4 are located between support posts 605 and 610, with bin A1 at the top, followed downward sequentially by A2, A3, and A4. Holding bins B1-B4 are located between support posts 610 and 615, with bin B1 at the top, followed downward sequentially by B2, B3, and B4. Holding bins C1-C4 are located between support posts 615 and 620, with bin C1 at the top, followed downward sequentially by C2, C3, and C4. Holding bins D1-D4 are located between support posts 620 and 625, with bin D1 at the top, followed downward sequentially by D2, D3, and D4.

On support post 605 is placed a passive RFID tag 630. On support post 610 is placed a passive RFID tag 635. On support post 615 is placed a passive RFID tag 640. On support post 620 is placed a passive RFID tag 645. On support post 625 is placed a passive RFID tag 650.

A passive RFID tag 655 is placed on the floor equidistant between support posts 605 and 610. A passive RFID tag 660 is placed on the floor equidistant between support posts 610 and 615. A passive RFID tag 665 is placed on the floor equidistant between support posts 615 and 620. A passive RFID tag 670 is placed on the floor equidistant between support posts 620 and 625.

A box is located in bin C2 between support posts 615 and 620, and associated with a passive RFID tag 680.

In various embodiments, a user, operator, or administrator of system 100 provides information specifying topology of warehouse shelf 600. For example, the user provides the physical location of each supports posts 605, 610, 615, 620, and 625. The user may specify the latitude and longitude of each support post, or its relationship to other objects whose location is know, such as being left, right, up, down, forward, back, and the like. The user may further specify the location of each of the holding bins.

For finer granularity, the user may specify the location of each of passive RFID tags 655, 660, 665, and 670. Locations for other passive RFID tags may be specified, such as to determine height, depth, other dimensions, and other degrees of freedom.

In one example of operation, an operator of mobile or handheld reader 675 is looking for box 655. The operator may set an antenna field of reader 675 to its maximum range and move from left to right starting at support post 605 in an attempt to receive the unique identifier associated with the passive RFID tag 680 associated with the box. The operator may pass supports posts 605, 610, and 615 before receiving the identifier of the passive RFID tag 680.

As the operator of reader 675 passes supports posts 605, 610, and 615, reader 675 receives identifiers for passive RFID tags 630, 635, and 640 on supports posts 605, 610, and 615. Reader 675 further receives identifies for passive RFID tags 655, 660, and 665.

Upon receiving the identifier for passive RFID tag 655 via reader 675, system 100 may determine that the location of the box is after support post 615. System 100 may approximate the location using the location of passive RFID tags 630, 635, 640, 655, 660, and 665. In various embodiments, system 100 triangulates the location of the box using the location of passive RFID tags 630, 635, 640, 655, 660, and 665.

The operator of reader 675 may also continue moving to the left past support posts 620 and 625 to gather more location information. For example, at time T=1 reader 675 receives identifiers for passive RFID tags 640 and 645 on support posts 615 and 620, passive RFID tag 665, and passive RFID tag 680 of the box. In the next moment at time T=2, reader 675 only receives identifiers for passive RFID tags 645 and 650 on supports posts 620 and 625. System 100 may then determine that the box is located behind the operator of reader 675.

In various embodiments, system 100 determines the location of the box in real-time, providing updates, notifications, alerts, and the like, to the operator of reader 675. In one embodiment, the notifications are presented to the operator using a display (e.g., user output interface 320 of FIG. 3). Other notifications may be visual, textual, audible, and the like.

In some embodiments, system 100 determines offline the location of the box. For example, reader 675 may be mounted to a vehicle, such as a forklift. The vehicle is then driven past warehouse shelf 600 where sensor data from reader 675 is recorded, such as with a timestamp. System 100 then may subsequently process the recorded sensor data to determine location of box 655.

In various embodiments, system 100 may determine discrepancies, inconsistencies, and/or conflicts between the currently determined location of an object and the previously recorded location of the object. In some embodiments, system 100 tracks the location of the object to resolve the discrepancy.

Figure 7:
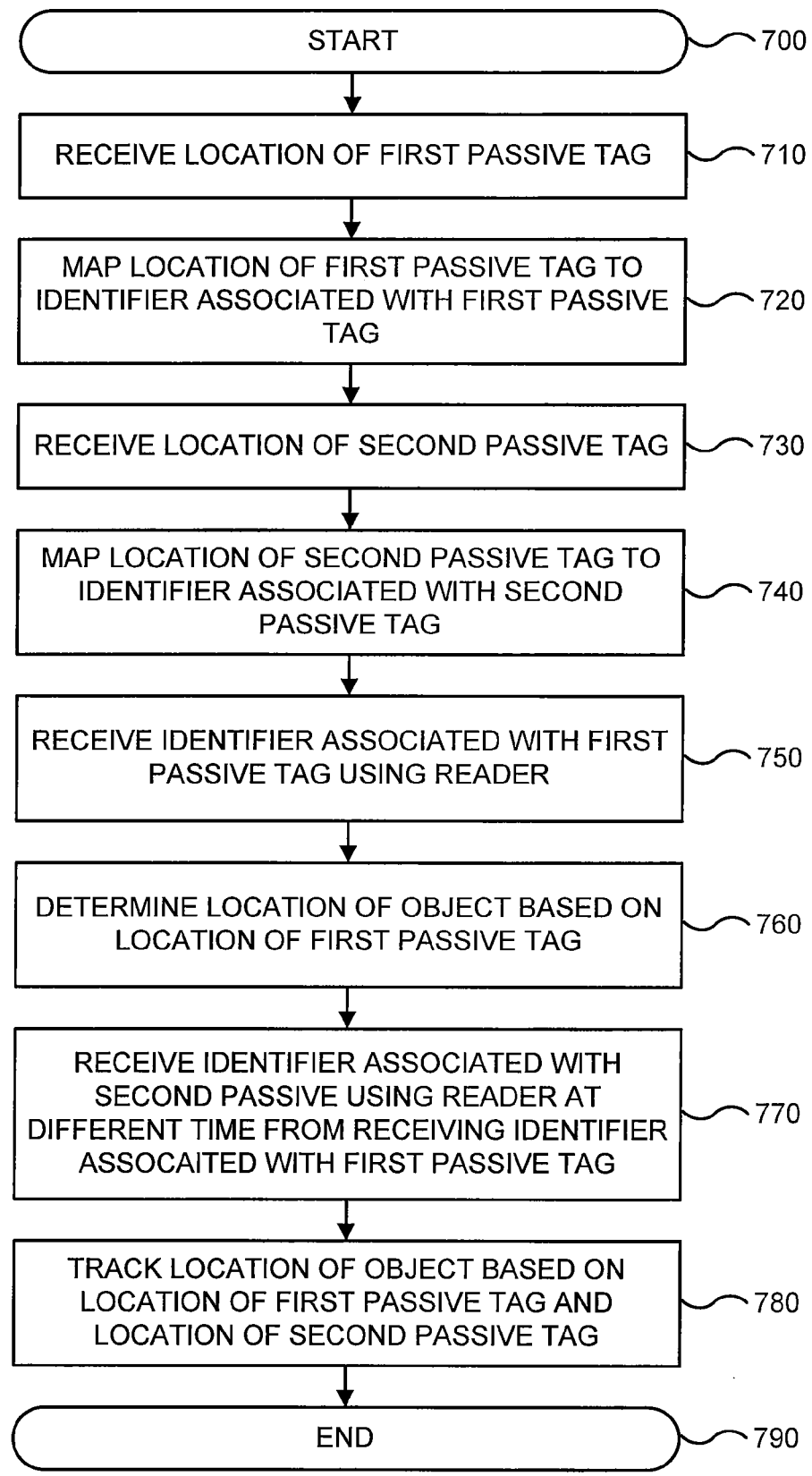
FIG. 7 is a flowchart for tracking the location of an object in one embodiment according to the present invention.

FIG. 7 is a flowchart for tracking the location of an object in one embodiment according to the present invention. FIG. 7 begins in step 700.

In step 710, system 100 receives the location of a first passive tag. In step 720, system 100 maps the location of the first passive tag to an identifier associated with the first passive tag.

In step 730, system 100 receives the location of a second passive tag. In step 740, system 100 maps the location of the second passive tag to an identifier associated with the second passive tag.

In step 750, system 100 receives the identifier associated with the first passive tag using a reader (e.g., reader 300 of FIG. 3). In step 760, system 100 determines the location of an object based on the location of the first passive tag.

In step 770, system 100 receives the identifier associated with the second passive tag using the reader at a different time from when the identifier for the first passive tag was received. In step 780, system 100 tracks the location of the object based on the location of the first passive tag and the location of the second passive tag. FIG. 7 ends in step 790.

As discussed previously, two or more passive RFID tags whose location is known may be used to triangulate or determine the location of an object using system 100 based on movement of reader 300. In some embodiments, reader 300 provides different antenna fields, which allows the reader 300 to be stationary at a given time. The antenna field of reader 300 is then adjusted or manipulated to provide different areas of coverage. Using sensor data from the different areas of coverage, system 100 then determines and/or updates the location an object.

Figure 8:
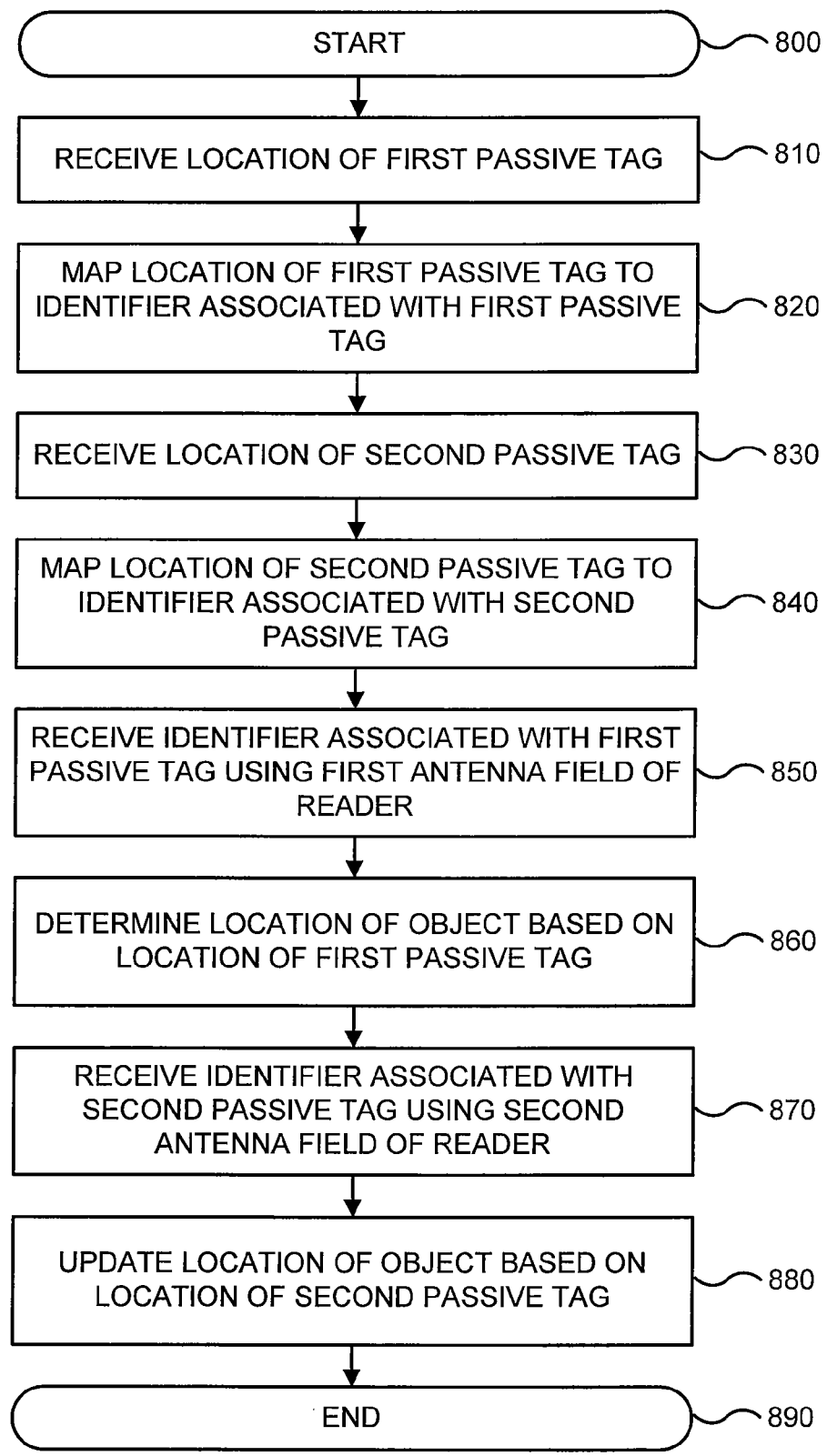
FIG. 8 is a flowchart for location tracking using different antenna fields of a reader in one embodiment according to the present invention.

FIG. 8 is a flowchart for location tracking using different antenna fields of a reader in one embodiment according to the present invention. FIG. 8 begins in step 800.

In step 810, system 100 receives the location of a first passive tag. In step 820, system 100 maps the location of the first passive tag to an identifier associated with the first passive tag.

In step 830, system 100 receives the location of a second passive tag. In step 840, system 100 maps the location of the second passive tag to an identifier associated with the second passive tag.

In step 850, system 100 receives the identifier associated with the first passive tag using a first antenna field of a reader (e.g., reader 300). In general, an antenna field refers to the gain and radiation patter of an antenna element of the reader. In step 860, system 100 determines the location of an object based on the location of the first passive tag.

In step 870, system 100 receives the identifier associated with the second passive tag using a second antenna field of the reader. For example, the operator of reader 300 may increase or decrease the current antenna field. The operator of reader 300 may adjust the gain and/or radiation pattern of antenna 335 to cover a larger area to receive the identifier associated with the second object.

In step 880, system 100 updates the location of the object based on the location of the second passive tag. FIG. 8 ends in step 890.

In some embodiments, system 100 determines an approximate location of the object within the coverage of the first antenna field using the location information for the first passive RFID tag. In various embodiments, system 100 triangulates the location of the object based on the known location of various passive RFID tags and interactive antenna manipulation techniques.

Figure 9:
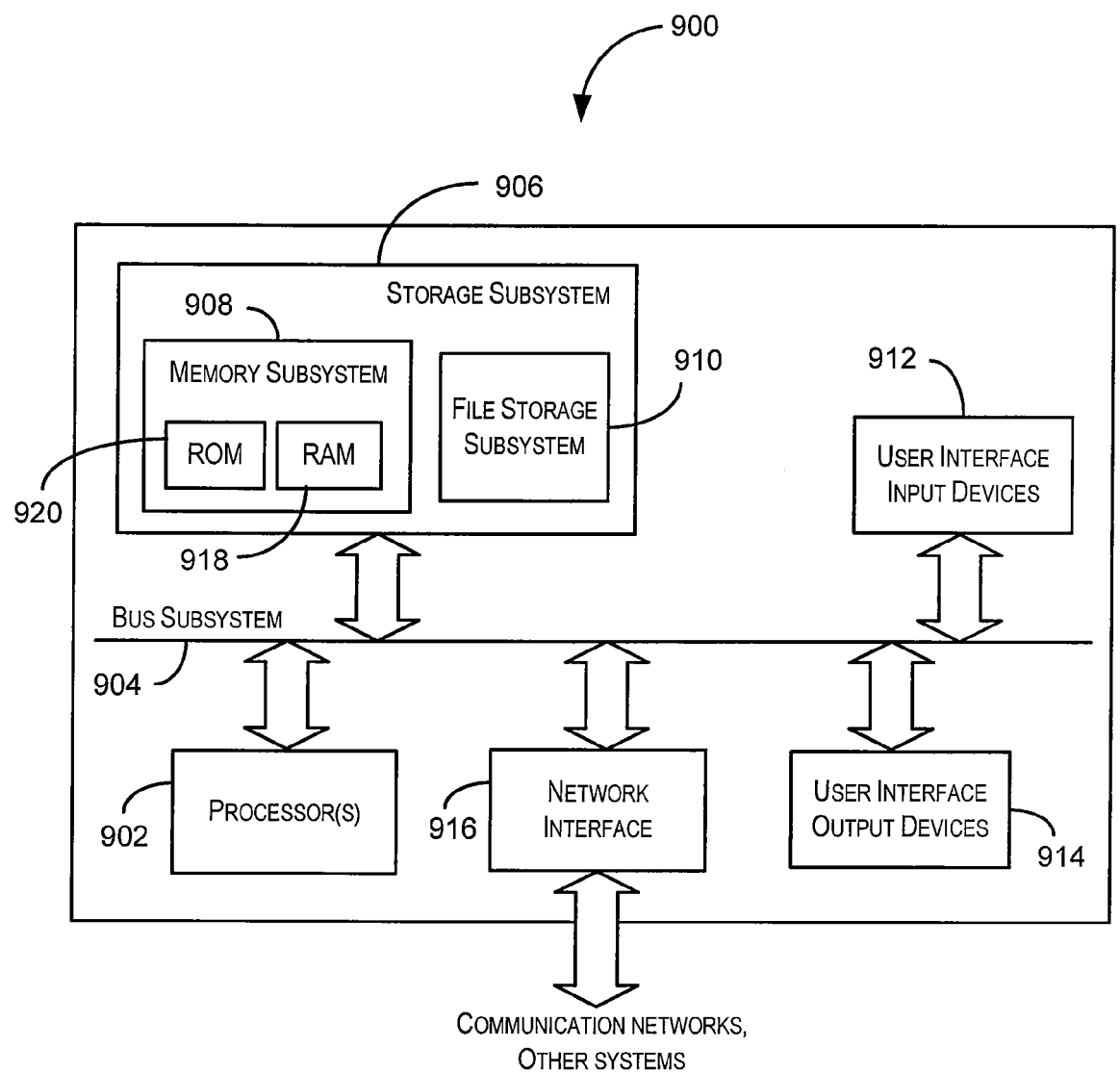
FIG. 9 is a simplified block diagram of a computer system that may be used to practice embodiments of the present invention.

FIG. 9 is a simplified block diagram of a computer system 900 that may be used to practice embodiments of the present invention.

As shown in FIG. 9, computer system 900 includes a processor 902 that communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916.

Bus subsystem 904 provides a mechanism for letting the various components and subsystems of computer system 900 communicate with each other as intended. Although bus subsystem 904 is shown schematically as a single bus, alternative embodiments of the bus subsystem may utilize multiple busses.

Network interface subsystem 916 provides an interface to other computer systems, and networks, and devices. Network interface subsystem 916 serves as an interface for receiving data from and transmitting data to other systems from computer system 900.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 900.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 may be configured to store the basic programming and data constructs that provide the functionality of the present invention. Software (code modules or instructions) that provides the functionality of the present invention may be stored in storage subsystem 906. These software modules or instructions may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 900 can be of various types including a personal computer, a portable computer, a workstation, a network computer, a mainframe, a kiosk, or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for locating an object within a facility, the method comprising:
    receiving, by one or more computer systems, for each fixed location passive tag of a plurality of fixed location passive tags, an identifier and a physical location within an area of a facility for the fixed location passive tag, wherein the fixed location passive tag comprises a tag that is not locally powered and is fixed in location with respect to the area of the facility;
    receiving, by the one or more computer systems, first read information obtained from a mobile tag reading device using a first antenna field of the mobile tag reading device, the first antenna field having a first range and being emitted from a first location, and the first read information being read from the first location and including (1) an identifier stored in an object passive tag that is physically associated with the object and (2) a first identifier associated with a first fixed location passive tag from the plurality of fixed location passive tags;
    determining, by one or more processors associated with the one or more computer systems, a first region within the area of the facility based on the physical location of the first fixed location passive tag and the first range of the first antenna field, wherein the first region includes a physical location of the object within the area of the facility within a first margin of error;
    receiving, at the one or more computer systems, second read information obtained from the mobile tag reading device using a second antenna field of the mobile tag reading device, the second antenna field having a second range and being emitted from a second location different from the first location, and the second read information being read from the second location and including (1) the identifier stored in the object passive tag that is physically associated with the object and (2) a second identifier associated with a second fixed location passive tag from the plurality of fixed location passive tags;
    determining, by the one or more processors associated with the one or more computer systems, a second region within the area of the facility based on the physical location of the second fixed location passive tag, the second range of the second antenna field, and the first region, wherein the second region identifies the physical location of the object within the area of the facility within a second margin of error, the second margin of error being smaller than the first margin of error;
    communicating, with the one or more processors associated with the one or more computer systems, to the mobile tag reading device (1) the physical location of the object based on the second region and the second margin of error and (2) the second margin of error; and
    adjusting at least one of a gain of the mobile tag reading device to define the second range or a radiation pattern of the mobile tag reading device to produce the second antenna field.

2. The method of claim 1, wherein the first antenna field has a first gain defining the first range and the second antenna field has a second gain defining the second range, wherein the second gain is different from the first gain.

3. The method of claim 1, wherein the first antenna field has a first gain defining the first range and the second antenna field has a second gain defining the second range, wherein the second gain is the same as the first gain.

4. The method of claim 1, further comprising:
    adjusting a gain of the mobile tag reading device to define the second range.

5. The method of claim 1, wherein the first antenna field has a first radiation pattern and the second antenna field has a second radiation pattern different from the first radiation pattern.

6. The method of claim 1, wherein a radiation pattern of the first antenna field and a radiation pattern of the second antenna field are the same.

7. The method of claim 1, further comprising:
    adjusting a radiation pattern of the mobile tag reading device to produce the second antenna field.

8. The method of claim 1, wherein the first read information is obtained from the mobile tag reading device at a first time and the second read information is obtained from the mobile tag reading device at a second time, the second time being later in time than the first time, the method further comprising:
    storing, with the one or more processors associated with the one or more computer system, information in a database hosted by the one or more computer systems, the stored information associating the first time with the first region, the first margin of error, and the object, and the stored information associating the second time with the second region, the second margin of error, and the object.

9. The method of claim 1, further comprising:
    retrieving, by the one or more computer systems, from a database hosted by the one or more computer systems, a stored physical location of the object;
    determining, with the one or more processors associated with the one or more computer systems, a discrepancy between the physical location of the object based on the second region and the second margin of error and the stored physical location of the object; and
    storing the physical location of the object based on the second region and the second margin of error in the database as an updated physical location of the object.

10. A system for locating objects within a facility, the system comprising:
    a communications interface;
    a processor; and
    a memory configured to store a set of instructions which, when executed by the processor, configure the processor to:
    receive, for each fixed location passive tag of a plurality of fixed location passive tags, an identifier and a physical location within an area of a facility for the fixed location passive tag, wherein the fixed location passive tag comprises a tag that is not locally powered and is fixed in location with respect to the area of the facility;

receive first read information obtained from a mobile tag reading device using a first antenna field of the mobile tag reading device, the first antenna field having a first range and being emitted from a first location, and the first read information being read from the first location and including (1) an identifier stored in an object passive tag that is physically associated with the object and (2) a first identifier associated with a first fixed location passive tag from the plurality of fixed location passive tags;

determine a first region within the area of the facility based on the physical location of the first fixed location passive tag and the first range of the first antenna field, wherein the first region includes a physical location of the object within the area of the facility within a first margin of error;

receive second read information obtained from the mobile tag reading device using a second antenna field of the mobile tag reading device, the second antenna field having a second range and being emitted from a second location different from the first location, and the second read information being read from the second location and including (1) the identifier stored in the object passive tag that is physically associated with the object and (2) a second identifier associated with a second fixed location passive tag from the plurality of fixed location passive tags;

determine a second region within the area of the facility based on the physical location of the second fixed location passive tag, the second range of the second antenna field, and the first region, wherein the second region identifies the physical location of the object within the area of the facility within a second margin of error, the second margin of error being smaller than the first margin of error;

communicate to the mobile tag reading device (1) the physical location of the object based on the second region and the second margin of error and (2) the second margin of error; and adjust at least one of a gain of the mobile tag reading device to define the second range or a radiation pattern of the mobile tag reading device to produce the second antenna field.

11. The system of claim 10, wherein the first antenna field has a first gain defining the first range and the second antenna field has a second gain defining the second range, wherein the second gain is different from the first gain.

12. The system of claim 10, wherein the first antenna field has a first gain defining the first range and the second antenna field has a second gain defining the second range, wherein the second gain is the same as the first gain.

13. The system of claim 10, wherein the first antenna field has a first radiation pattern and the second antenna field has a second radiation pattern different from the first radiation pattern.

14. The system of claim 10, wherein a radiation pattern of the first antenna field and a radiation pattern of the second antenna field are the same.

15. The system of claim 10, wherein the first read information is obtained from the mobile tag reading device at a first time and the second read information is obtained from the mobile tag reading device at a second time, the second time being later in time than the first time, and wherein the processor is further configured to:

store information in a database, the stored information associating the first time with the first region, the first margin of error, and the object, and the stored information associating the second time with the second region, the second margin of error, and the object.

16. The system of claim 10, wherein the processor is further configured to:

retrieve from a database a stored physical location of the object;

determine a discrepancy between the physical location of the object based on the second region and the second margin of error and the stored physical location of the object; and store the physical location of the object based on the second region and the second margin of error in the database as an updated physical location of the object.

17. A computer-readable memory storage device storing a set of instructions operational when executed by a processor of a computer system for locating objects within a facility, the computer-readable memory storage device comprising:

code for receiving, for each fixed location passive tag of a plurality of fixed location passive tags, an identifier and a physical location within an area of a facility for the fixed location passive tag, wherein the fixed location passive tag comprises a tag that is not locally powered and is fixed in location with respect to the area of the facility;

code for receiving first read information obtained from a mobile tag reading device using a first antenna field of the mobile tag reading device, the first antenna field having a first range and being emitted from a first location, and the first read information being read from the first location and including (1) an identifier stored in an object passive tag that is physically associated with the object and (2) a first identifier associated with a first fixed location passive tag from the plurality of fixed location passive tags;

code for determining a first region within the area of the facility based on the physical location of the first fixed location passive tag and the first range of the first antenna field, wherein the first region includes a physical location of the object within the area of the facility within a first margin of error;

code for receiving second read information obtained from the mobile tag reading device using a second antenna field of the mobile tag reading device, the second antenna field having a second range and being emitted from a second location different from the first location, and the second read information being read from the second location and including (1) the identifier stored in the object passive tag that is physically associated with the object and (2) a second identifier associated with a second fixed location passive tag from the plurality of fixed location passive tags;

code for determining a second region within the area of the facility based on the physical location of the second fixed location passive tag, the second range of the second antenna field, and the first region, wherein the second region identifies the physical location of the object within the area of the facility within a second margin of error, the second margin of error being smaller than the first margin of error;

code for communicating to the mobile tag reading device (1) the physical location of the object based on the second region and the second margin of error and (2) the second margin of error; and code for adjusting at least one of a gain of the mobile tag reading device to define the second range or a radiation pattern of the mobile tag reading device to produce the second antenna field.

18. The computer-readable memory storage device of claim 17, wherein the first antenna field has a first gain defining the first range and the second antenna field has a second gain defining the second range, wherein the second gain is different from the first gain.

19. The computer-readable memory storage device of claim 17, wherein the first antenna field has a first radiation pattern and the second antenna field has a second radiation pattern different from the first radiation pattern.

20. The computer-readable memory storage device of claim 17, wherein the first read information is obtained from the mobile tag reading device at a first time and the second read information is obtained from the mobile tag reading device at a second time, the second time being later in time than the first time, the computer-readable memory storage device comprising further comprising:

code for storing information in a database, the stored information associating the first time with the first region, the first margin of error, and the object, and the stored information associating the second time with the second region, the second margin of error, and the object.

\* \* \* \* \*

UNITED STATES PATENT AND TRADEMARK OFFICE
CERTIFICATE OF CORRECTION

PATENT NO. : 9,536,215 B2
APPLICATION NO. : 11/685673
DATED : January 3, 2017
INVENTOR(S) : Rehman It is certified that error appears in the above-identified patent and that said Letters Patent is hereby corrected as shown below:

In the Specification

In Column 9, Line 65, delete "know," and insert -- known, --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*